Patented Feb. 14, 1950

2,497,135

UNITED STATES PATENT OFFICE 2,497,135

POLYMERIC SULFUROUS ACID ESTERS

William J. Myles, Summit, and John H. Prichard, Springfield, N. J., assignors to Celanese Corporation of America, a corporation of Delaware No Drawing. Original application January 21, 1947, Serial No. 723,466. Divided and this application January 13, 1948, Serial No. 2,125

5 Claims. (Cl. 260—456)

This application is a division of our co-pending application S. No. 723,466, filed on January 21, 1947, which issued on March 29, 1949 as Patent No. 2,465,915.

This invention relates to certain novel organic sulfurous acid esters and relates more particularly to certain long chain polymeric organic sulfurous acid esters of relatively high molecular weight which may be employed as stabilizing agents.

An object of this invention is the production of novel, long chain polymeric organic esters of sulfurous acid.

Another object of this invention is the production of novel long chain polymeric organic esters of sulfurous acid which are suitable for use as stabilizing agents for the stabilization of thermoplastic compositions having a basis of a cellulose derivative.

Other objects of this invention will appear from the following detailed description.

While our invention will be more particularly described in connection with the use of said novel sulfurous acid esters for the stabilization of thermoplastic molding compositions having a basis of ethyl cellulose, equally valuable results are obtained in stabilizing other cellulose ethers, such as benzyl cellulose, as well as cellulose esters such as, cellulose nitrate, cellulose acetate, cellulose propionate, cellulose butyrate, cellulose acetate-propionate and cellulose acetate-butyrate.

Thermoplastic compositions having a basis of ethyl cellulose, which are widely employed commercially for the preparation of molded articles, possess certain characteristics which impair their utility. For example, some molded ethyl cellulose compositions possess an inherent yellowish color even prior to molding, while others frequently develop yellowish or yellowish brown colors during processing operations, particularly where the processing operations include the use of heat.

Where some color is initially present in the ethyl cellulose compositions, this color may bleach to a lighter shade, or even disappear upon exposure to light. This characteristic of color instability makes a standardized or controlled application of such ethyl cellulose compositions quite difficult. Where, for example, a colorist is working with an ethyl cellulose composition which possesses some color initially, he may be able to match a particular shade to a known, colored standard without difficulty. However, on prolonged exposure of the colored compositions to light, changes in shade will occur to a very noticeable degree due to a loss of some of the color initially present in the sample because of the bleaching action of the light. When working with a particular ethyl cellulose which develops some color on molding or during other processing operations involving the use of heat, the color which is known to develop must be compensated for with care in order that the final molded product will have the exact shade which is desired. Even the slightest deviation from the desired molding conditions, such as, for example, a slight increase or decrease in the time or temperature of molding, will noticeably alter the shade.

The use of many stabilizers has been proposed in order to overcome this tendency toward color instability. The object of incorporating such stabilizing agents in the ethyl cellulose compositions is to minimize any changes in shade due to the action of light or heat where the ethyl cellulose possesses some color initially, or where the ethyl cellulose tends to develop some color when molded. Color stabilization methods presently employed are characterized by the fact that they effect a marked lowering in the viscosity, heat stability and/or resistance to crazing of the stabilized material and by the fact that many of these materials of themselves impart an undesirable degree of color to the stabilized ethyl cellulose compositions. The application of stabilizing agents which do not possess these drawbacks would render thermoplastic molding compositions of ethyl cellulose much more useful and more widely applicable.

We have now found that when thermoplastic cellulose derivative molding compositions are stabilized by incorporating therein certain novel long chain polymeric organic sulfurous acid esters of relatively high molecular weight and of the following general formula:

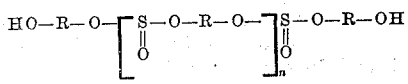

wherein $n$ is an integer, e. g. 1 to 15 or more, R is a chain containing at least four carbon atoms and is the divalent residue normally linking the hydroxy groups of the polyhydroxy alcohol, said compositions are very effectively stabilized against undesirable color changes.

These novel polymeric organic sulfurous acid esters are obtained by reacting a suitable polyhydroxy alcohol having at least four carbon atoms in the chain separating the hydroxy groups as in the case of 1,4-butanediol, which chain may or may not be interrupted by an oxygen atom or the like, as in the case of di-ethylene glycol, with thionyl chloride. The by-product hydrogen chloride, which forms during the course of the reaction, is removed either by effecting the reaction in the presence of a suitable acid binding agent such as pyridine, by sweeping the reaction vessel during the reaction with a stream of air or a stream of an inert gas, or by continuously evacuating the reaction vessel to withdraw the hydrogen chloride. The organic sulfite may then be purified by fractional distillation, and the like.

Thus, for example, when 1,4-butanediol is reacted with thionyl chloride, poly-1,4-butanediol sulfite is obtained. When diethylene glycol, or tri-ethylene glycol, is reacted with thionyl chloride, poly-di-ethylene glycol sulfite or poly-tri-ethylene glycol sulfite is obtained. Additional examples of our novel long chain polymeric organic sulfites are poly-1,10-decanediol sulfite, poly-dipropylene glycol sulfite and poly-diglycerol sulfite, all of which are heavy, viscous liquids or resins of extremely low volatility and practically no odor and are found to be particularly advantageous as stabilizers for ethyl cellulose compositions.

The esterification is usually effected by reacting equimolecular quantities of the desired poly-hydroxy compound with thionyl chloride in a suitable jacketed vessel, preferably at a temperature below about 35° C. and removing the hydrogen chloride continuously as it is formed. The evolution of the gaseous hydrogen chloride cools the reaction mass so that sufficient heat should be supplied to the reaction vessel, if undue cooling takes place, to maintain the temperature at about 15 to 35° C. during the esterification. In some instances, however, very low reaction temperatures, i. e. about —20 to —50° C., are satisfactory, particularly where undesirable side reactions, such as dehydration of the polyhydroxy compounds with the formation of cyclic ethers, take place at higher reaction temperatures. The hydrogen chloride remaining in the reaction mixture is neutralized by slowly pouring the oily reaction mixture into an aqueous solution of sodium carbonate or other neutralizing agent while continuously agitating to maintain the organic sulfite in a finely divided form. After the thoroughly neutralized organic sulfite reaction product has settled, the upper water layer is drawn off and the organic sulfite again washed, this wash being effected, usually, with an aqueous solution of sodium sulfate. The neutralized organic sulfite is then dried with the aid of heat and vacuum, the temperature of the organic sulfite being raised to 100 to 110° C. employing a vacuum of 29 to 30 inches of mercury. The organic sulfite is then filtered while hot, and stored prior to use.

When said organic sulfites are incorporated in ethyl cellulose compositions in amounts of from 0.1 to 5 parts by weight for each 100 parts by weight of ethyl cellulose present, the resulting composition is found to be of excellent stability and may be exposed to high temperatures during molding, extrusion and the like without the development of an undesirable yellow or yellow-brown color in the molded material.

The stabilizing agents may be incorporated in the ethyl cellulose molding compositions in any convenient manner. They may be mixed with the ethyl cellulose in flake form during the preparation or final washings of the ethyl cellulose or after it is dried and prior to colloidallization or they may be dissolved or suspended in the plasticizers employed and the solution obtained then combined with the ethyl cellulose. They may also be mixed with the volatile solvents in which the ethyl cellulose is dissolved if a solvent casting operation is employed, as in the preparation of film materials. The stabilizing agents may also be added directly to the plastic mass while it is being converted or colloided at elevated temperature on hot rolls, or in a suitable mill as, for example, a Banbury mixer or a Werner-Pfleiderer kneader.

The stabilizing agents are also highly effective when incorporated in sheets, rods, tubes, films, foils, etc., particularly where the production of said materials involves the use of heat. For example, in the production of sheets by the "block" method, rolled slabs of the cellulose derivative are consolidated under heat and pressure to form a solid cake or block from which sheets are cut. The use of said stabilizers renders the thermoplastic material highly resistant to the detrimental effects of high temperature during the consolidation or molding of the block. Said stabilizers are also valuable when incorporated in films and foils since the latter are frequently exposed to elevated temperatures as during drying, heat-sealing or laminating operations. In some instances said stabilizing agents also may be employed as solvent plasticizers.

The organic sulfites employed as stabilizing agents in accordance with the process of our invention have no detrimental effect upon the plasticizers, dyes or pigments normally employed in the preparation of ethyl cellulose or other cellulose ether molding compositions.

In order further to illustrate our invention, but without being limited thereto, the following examples are given:

*Example I*

1 mol of di-ethylene glycol is charged into a jacketed, glass-lined reactor, cooled to 15° C. and then 1.02 mols of thionyl chloride are gradually added below the surface of the diethylene glycol. The temperature is kept below 35° C. by circulating a suitable cooling medium through the jacket of the reactor. The thionyl chloride is added slowly due to the rapid increase in temperature prior to the evolution of the hydrogen chloride. As the hydrogen chloride begins to evolve from the reaction mass the temperature falls rapidly and steam is admitted to the jacket to maintain the temperature at about 20° C. The reactor is continuously evacuated as the hydrogen chloride evolves and dried air is then bubbled through the mixture to agitate it and to aid in sweeping the hydrogen chloride therefrom. The reaction mixture obtained is then slowly drawn by vacuum into a 10% aqueous solution of sodium carbonate while agitating the mixture. Agitation is continued to insure thorough neutralization of any of the hydrogen chloride remaining in the reaction mass. The mixture is allowed to settle, the upper water layer drawn off and the oily poly-di-ethylene glycol sulfite is washed with an aqueous solution of sodium sulfate. The oily layer of poly-di-ethylene glycol sulfite is then dried by the application of heat under a vacuum. The temperature of the poly-di-ethylene glycol sulfite is raised to 100 to 110° C. while subjecting it to a vacuum of 29 to 30 inches of mercury. When it is thoroughly dried a diatomaceous earth filter aid is added and the hot oily liquid is filtered. A yield of 75% of theoretical is obtained. The product is a long chain polymer having about 11 times the theoretical molecular weight of di-ethylene glycol sulfit. The novel poly-di-ethylene glycol sulfit has a specific gravity at 25° C. of 1.397, a refractive index ($n_D^{25}$) of 1.4935 and is soluble in water to the extent of less than 0.02%. The boiling point is quite high. Even at 0.005 mm., pressure the poly-di-ethylene glycol begins to decompose and to liberate sulfur dioxide before any distillation can be accomplished.

As a stabilizing agent, the poly-di-ethylene glycol may be employed in the following manner: 100 parts by weight of ethyl cellulose flake having an ethoxyl value of 45%, 15 parts by weight of dibutyl phthalate and 2 parts by weight of the poly-di-ethylene glycol sulfite are mixed thoroughly and the mixture molded into discs at 200° C. for 15 minutes. The discs obtained have a yellowness coefficient of .25 while discs molded of plasticized ethyl cellulose from which the stabilizer has been omitted have a yellowness coefficient of .72.

The numerical expression of color development, i. e. the yellowness coefficient, is obtained by determining the light transmission of the sample in question at 640 m$\mu$ minus that at 440 m$\mu$ divided by the light transmission at 640 m$\mu$; the greater this coefficient, the greater the degree of color.

*Example II*

One mol of thionyl chloride is cooled to —64° C. and then one mol of 1,4-butanediol is slowly added thereto. The temperature rises somewhat but is maintained between about —20 to —45° C. during the course of the esterification. The hydrogen chloride formed is continuously evacuated and the hydrogen chloride remaining at the completion of the esterification is removed by heating the reaction mixture to room temperature under 0.1 mm. pressure. The oily product is washed with a 5% aqueous sodium carbonate solution. A yield of 78% of a crude viscous oily product is obtained.

We have also prepared various other polymeric sulfurous acid esters and their properties are indicated in the table below:

| Polymeric Sulfite of— | Remarks | Density ($d_4^{25}$) | Refractive Index ($n_D^{25}$) |
|---|---|---|---|
| 1,10-decanediol | wax-like substance | | |
| Dipropylene glycol | viscous oil | 1.147 | 1.4602 |
| Triethylene glycol | very viscous oil | 1.264 | 1.4789 |

It is to be understood that the foregoing detailed description is given merely by way of illustration and that many variations may be made therein without departing from the spirit of our invention.

Having described our invention, what we desire to secure by Letters Patent is:

1. A polymeric polyhydroxy alcohol ester of sulfurous acid having the following structure:

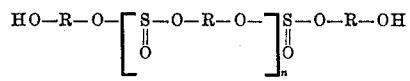

wherein $n$ is an integer no greater than 15 and R is a saturated straight hydrocarbon chain containing at least four and at most ten carbon atoms and is the divalent residue normally linking the hydroxy groups of a polyhydroxy alcohol.

2. A polymeric polyhydroxy alcohol ester of sulfurous acid having the following structure:

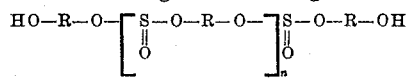

wherein $n$ is an integer no greater than 15 and R is a saturated straight chain containing at most carbon, hydrogen and oxygen and at least four and at most ten carbon atoms and is the divalent residue normally linking the hydroxy groups of a polyhydroxy alcohol.

3. An organic ester of sulfurous acid of the structure set forth in claim 2 comprising essentially poly-di-ethylene glycol sulfite.

4. An organic ester of sulfurous acid of the structure set forth in claim 1 comprising essentially poly-butanediol sulfite.

5. An organic ester of sulfurous acid of the structure set forth in claim 2 comprising essentially poly-tri-ethylene glycol sulfite.

WILLIAM J. MYLES.
JOHN H. PRICHARD.

REFERENCES CITED

The following references are of record in the file of this patent:

FOREIGN PATENTS

| Number | Country | Date |
|---|---|---|
| 710,350 | Germany | Sept. 11, 1941 |

OTHER REFERENCES

Majima et al., "Centralblatt," 1927, part I page 2415.

Kitasato et al., "Ber. Deut. Chem. Ges.," vol. 64 (1931), pages 1142–5.

Denivelle, "Comptes Rendus," vol. 208 (1939), pages 1024–5.

Rovira et al., "Comptes Rendus," vol. 212 (1941), pages 643–5.